Feb. 12, 1946. R. JEFFORDS 2,394,781
SPRAYING MACHINE
Filed April 17, 1943 3 Sheets-Sheet 1
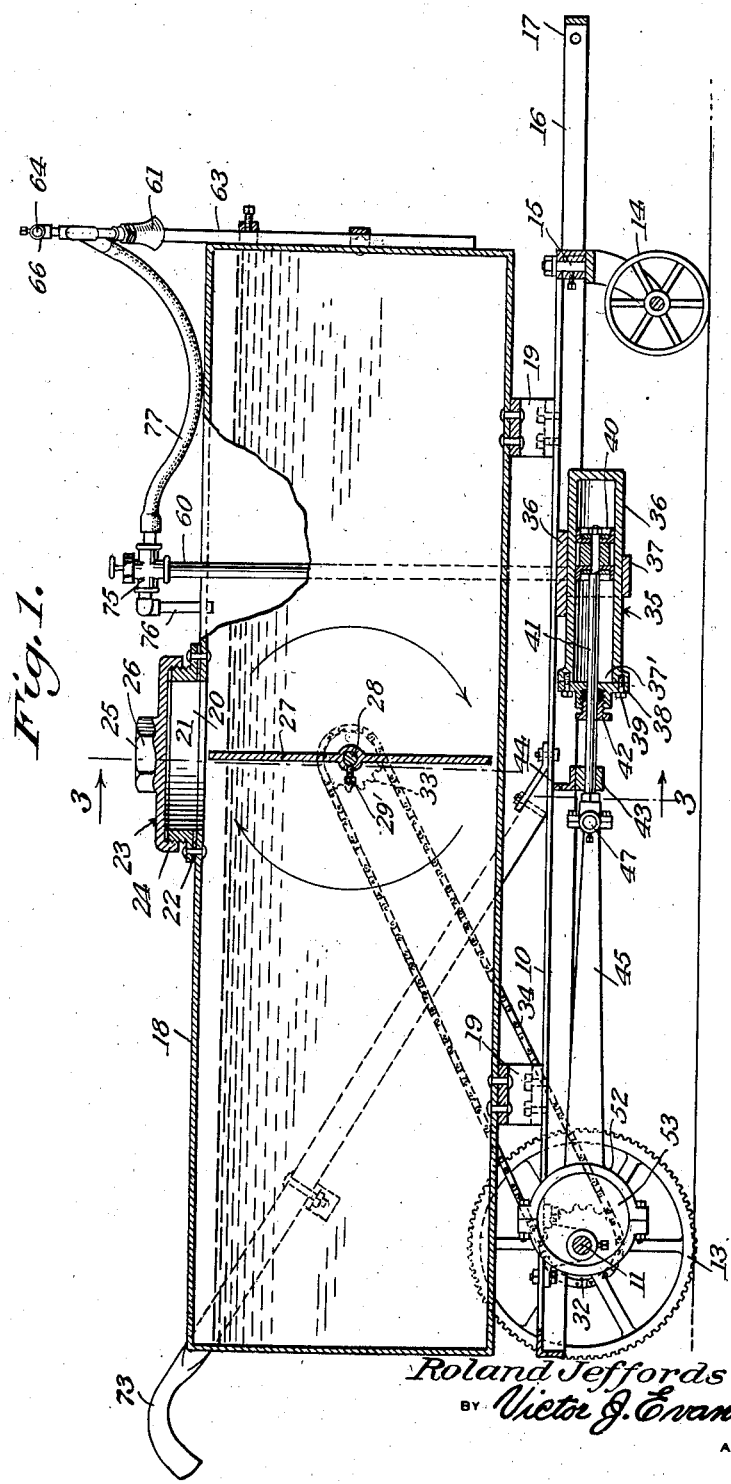
Roland Jeffords INVENTOR
BY Victor J. Evans & Co.
ATTORNEYS

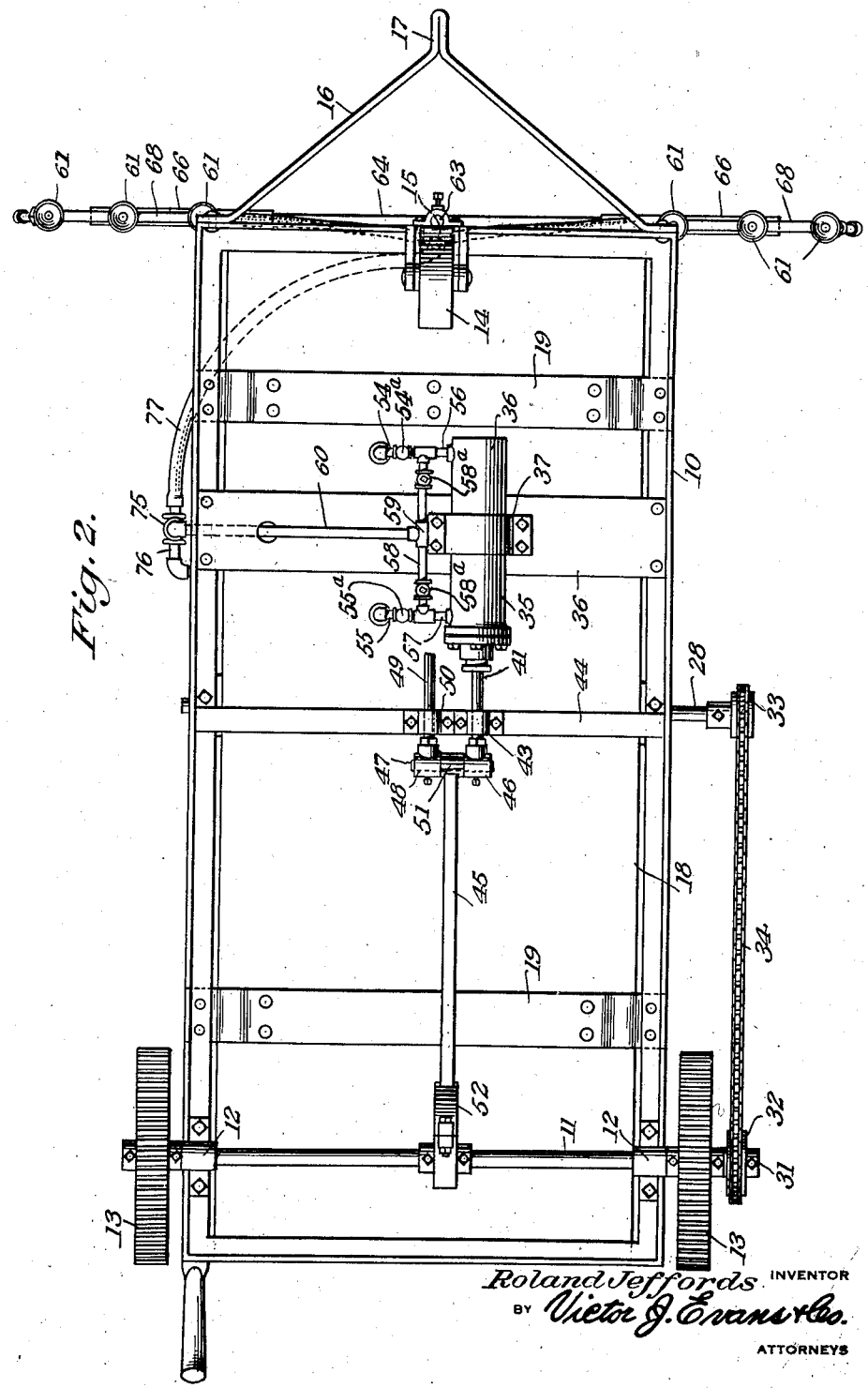

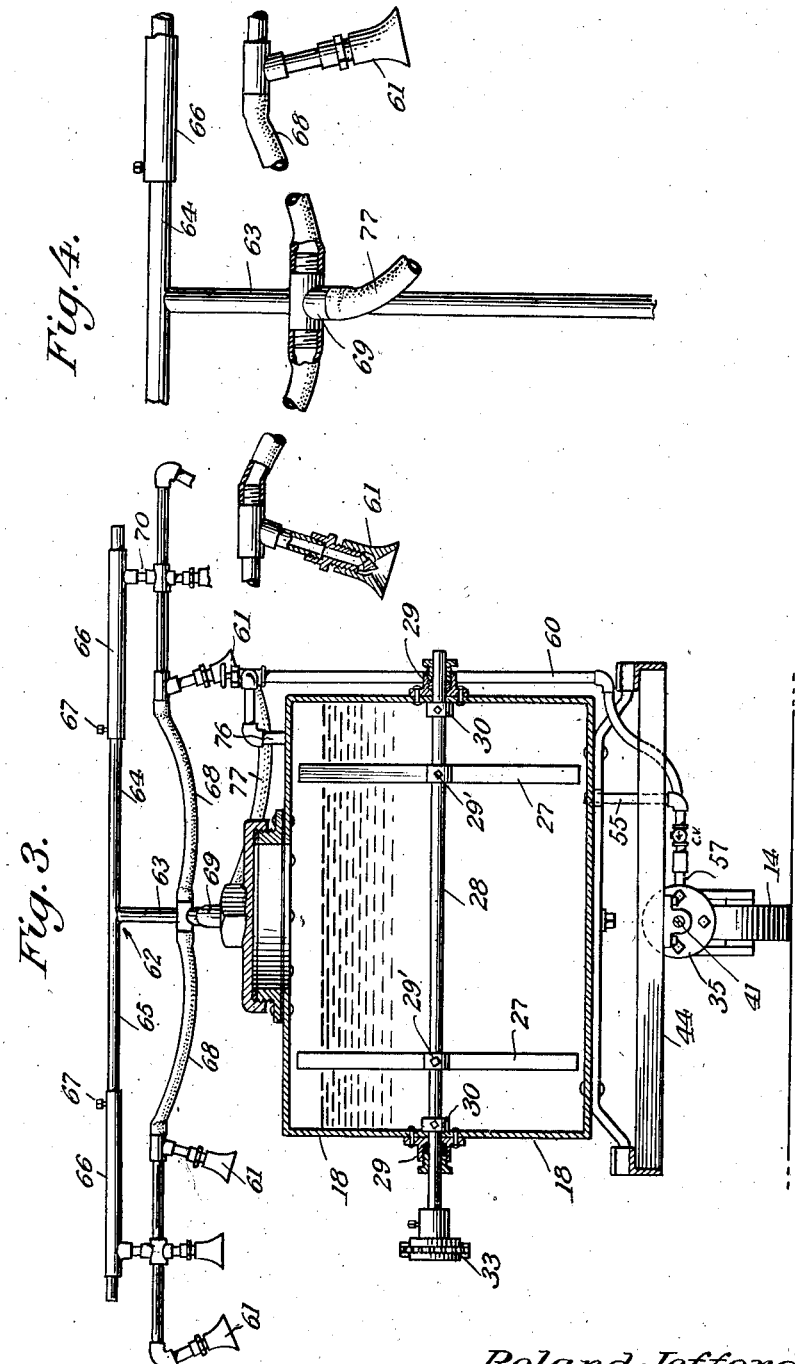

Patented Feb. 12, 1946

2,394,781

UNITED STATES PATENT OFFICE 2,394,781

SPRAYING MACHINE

Roland Jeffords, Pamplico, S. C.

Application April 17, 1943, Serial No. 483,423

1 Claim. (Cl. 299—42)

My invention relates to new and useful improvements in liquid spraying devices.

An important object of my invention is the provision of a spraying device that is readily portable, that may be easily and expeditiously directed through a field to be sprayed and that includes means for efficaciously discharging the liquid in an essentially fine spray on the plants growing in the field.

Another object of my invention is to provide a spraying device of the above-mentioned character which is light and compact in construction. The lightness in weight facilitating the movement and guidance of the device as it traverses the field and the compactness of construction reducing the number of moving parts to a minimum and promoting the inexpensive manufacture and efficient operation thereof.

Another object of my invention is to provide a portable spraying device of the above-mentioned character wherein the liquid receiving parts thereof are uniquely associated to promote simplicity of construction and wherein the several parts may be easily disassembled and cleaned.

Other objects and advantages of my invention will be apparent during the course of the following description.

In the drawings, forming a part of this specification, and wherein like numerals are employed to designate like parts throughout the same, Figure 1 is a longitudinal sectional view of a spraying device embodying my invention, Figure 2 is a bottom plan view thereof, Figure 3 is a transverse sectional view taken on the line 3—3 of Figure 1, and Figure 4 is an enlarged fragmentary view of the spray nozzle arrangement, parts of the arrangement being shown in elevation and parts in section for clearness of illustration.

In the accompanying drawings, wherein for the purpose of illustration, is shown a preferred embodiment of my invention, the numeral 10 designates a supporting frame preferably of angle or channel iron construction and of essentially rectangular formation in plan. The rearward end of the frame is supported by an axle 11 journaled for rotation in the bearings 12. The opposite ends of the axle extend beyond the bearings and the traction wheels 13 are keyed, or otherwise fixedly secured thereto, the periphery of the wheels 13 being preferably serrated, as illustrated in Figure 1, to permit the same to obtain traction on the ground surface. The forward end of the frame is supported by a swivel castor 14 which is adapted to move about the pivot pin 15 in a manner to permit the frame to be readily guided in any direction. A bracket 16 extends forwardly of the frame and the distal end thereof is formed with an extending tongue 17 adapted to receive the attaching lug of a tractor or other suitable means for moving the support.

An essentially large rectangular tank 18 is supported above the frame 10 by the essentially heavy leaf springs 19. A spring 19 is disposed at each end of the tank and, as best illustrated in Figure 2, each extends transversely of the frame and has its opposite ends riveted, or otherwise secured thereto. The tank is adapted to be filled with a suitable liquid to be sprayed on a field of growing plants, and the upper end thereof is, therefore, provided with a circular filler opening 20. An exteriorly screw-threaded annulus 21 is provided with a radial base flange 22 which encloses the opening 20 and is riveted, or otherwise secured to the tank and a closure cap 23 is provided with an internally screw-threaded annular skirt 24 adapted to threadedly engage the annulus 21 to close the opening. The cap 23 is formed centrally thereof with an extending boss 25, the periphery of which is formed with angularly related wrench receiving faces 26 to which a conventional wrench may be fitted for effecting application or removal of the cap from the annulus.

In order that the liquid within the tank may be continually stirred or agitated, I have provided a pair of rotating blades or fins 27 mounted for rotation with a spindle 28 operating through the stuffing boxes 29 in the side walls of the tank. Each of the blades is held in fixed association with the spindle by means of a set screw 29', or the like, and collars 30 are carried by the shaft in abutting relation with the inner surface of the side walls of the tank to hold the spindle against longitudinal movement. As is well known to those versed in the art, the followers or glands of the stuffing boxes may be selectively positioned or adjusted to compress the packing in a manner to prevent the liquid within the tank from having egress therefrom around the journaled portions of the spindle. The end 31 of the traction driven axle 11 extends beyond the wheel 13 and a sprocket 32 is fixedly secured thereto for rotation therewith. The spindle 28 extends substantially beyond the side of the tank above and in front of the extending end 31 of the axle and a sprocket 33 is similarly fixedly secured thereto. An endless chain 34 connects the sprockets 32 and 33 whereby rotation of the axle will effect rotation of the blades 27 within the tank to thoroughly agitate the liquid.

A compressor 35 is suspended from the transverse web 36 of the frame below the tank 18 by the strap 37. The compressor comprises a cylinder 36 having an open end 37' normally closed by the wall 38, which wall is detachably secured to the cylinder by means of the bolts 39, or the like. Mounted for reciprocation within the cylinder is a piston 40 and the piston rod 41 carried thereby operates through the stuffing box 42 in the end wall 38. The piston rod extends through an aligning bearing 43 mounted on the transverse brace 44 of the frame and pivotally attaches to the connecting rod 45. The end of the piston rod extending beyond the bearing 43 is provided with a bearing 46 which receives one end of the extending horizontal journal 47. Mounted on the other end of the journal and in spaced relation with the bearing 46 is a second bearing 48 carrying a stub spindle 49 which extends in spaced parallel relation with the piston rod and is slidably received by the bearing 50 carried by the brace 44. The journaled end 51 of the connecting rod 45 is pivotally connected to the journal 47 intermediate the bearings 46 and 48 and the opposite end thereof is provided with an essentially large collar 52. An eccentric 53 rotates with the axle and within the collar 52 to impart a reciprocating motion to the piston 40.

Reciprocation of the piston within the cylinder will cause fluid from within the tank 18 to be drawn into the cylinder through the pipes 54 and 55. The ends 56 and 57 of the pipes are connected to the opposite ends of the cylinder and the other ends thereof are connected to the bottom wall of the tank 18. Connecting with the pipes 54 and 55 intermediate their ends is a pipe 58 including a T-fitting 59 to which the discharge conduit 60 is connected. The conduit 60 extends upwardly to the top of the tank where it connects with a manually operated three-way control valve 75. A pipe 76 leads from the valve back into the tank and a pipe 77 extends from the valve to a spray nozzle system mounted at the front of the tank. The pipe 58 is provided at opposite sides of the pipe 60 with the check valves 58a seating in the direction of the pump cylinder 36, and the pipes 54 and 55 are provided with check valves 54a and 55a, respectively, seating in the direction of the tank 18, as clearly shown in Figure 2. The arrangement of the check valves is such that the pump will, when in operation, draw the liquid from the tank and deliver it to the pipe 60.

A plurality of spray nozzles 61 are mounted on the standard 62 and are adapted to receive liquid from the discharge conduit 60. The standard 62 comprises a substantially T-shaped member the stem 63 of which is vertically adjustably mounted on the front end of the tank 18. The stem is preferably positioned at substantially the middle of the tank so that the arms 64 and 65 extending at opposite sides thereof may position the nozzles laterally of the tank. Elongated sleeves 66 are slidably mounted on each of the arms 64 and 65 and the sleeves may be held in a selected adjusted position thereon by the set screws 67. The pipe sections inserted in the opposite ends of the distributing conduit 68 are secured to the sleeves 66 by suitable connections 70 and the conduit is connected intermediate its ends with the end 69 of the pipe 77. The nozzles 61 connect with the pipe sections of the conduit 68 at spaced intervals along their length and, by moving the sleeves 66 along the arms 64 and 65, the spray nozzles may be selectively positioned relative to the tank.

Of course, if the piston 40 is to force the liquid under pressure through the conduit 60, check valves must be positioned in the pipes 54 and 55 above the juncture of the pipe 58 therewith. The check valves preferably seat upwardly under the influence of a suitable spring means whereby the valve will be opened on the suction stroke of the piston and closed on the compression stroke thereof. Thus, when the piston is moving forwardly in the cylinder, the valve in the pipe 55 will be open to admit fluid from the tank into the portion of the cylinder rearwardly of the piston. As the piston moves toward the rearward end of the cylinder the valve in the pipe 55 will close and the valve in the pipe 54 will open to admit fluid from the tank into the portion of the cylinder in front of the piston. Movement of the piston toward the rearward end of the cylinder and closing of the valve in the pipe 55 will permit the fluid to be discharged through the pipe 58 and conduit 60 to the discharge nozzles 61. To prevent the fluid from merely flowing from one end of the cylinder to the other through the pipe 58, I prefer that a check valve be disposed in each arm of the fitting 59. Each of the valves is adapted to seat in a direction away from the conduit 60 whereby the valve at the compression side of the conduit will be opened and the valve at the suction side thereof will be closed by the rush of fluid from the cylinder and through the conduit 60.

In operation, the apparatus is pulled through the field by a tractor, a team of horses, or by any other suitable means. Handles 73 extend rearwardly of the tank at opposite sides thereof in a manner to be readily grasped by an operator walking at the rear of the tank. The operator, by leaning on one or the other of the handles may effect pivoting of the front castor 14 to guide the device either to the right or to the left. As the device moves along the surface of the ground, the traction wheels 13 will rotate the axle which, in turn, will agitate the blades 27 within the tank through the medium of the endless chain 34 and reciprocate the piston 40 through the medium of the connecting rod 45. The rotation of the blades 27 will maintain the liquid within the tank thoroughly mixed and agitated at all times and the reciprocation of the pistons 40 will assure a constant flow of the liquid to the spray nozzle 61. The liquid will discharge from each of the spray nozzles in an essentially fine spray which will fall upon the leaves and stalks of the plants growing in the vicinity.

One advantage of the present arrangement is that the parts are uniquely assembled and corelated to permit the same to be readily cleaned. By removing the closure cap 23, the ends of the pipes 54 and 55 connecting with the tank, and the wall 38 of the cylinder, the interior of the tank, cylinder and connecting pipes may be easily flushed with water, or other cleansing fluid. It is then a simple matter to connect these parts to again render the device in condition for further operation.

When the device is being moved from place to place and under such conditions that it would be undesirable to have the liquid from the tank discharging from the nozzles, the control valve 75 may be adjusted to divert the liquid back into the tank through the pipe 76. When the device is being normally operated, however, the valve will be adjusted to close communication with the pipe 76 and to direct the flow of fluid through the pipe 77 from whence it is carried to the spray nozzles and discharged in a fine spray onto the plants being treated.

It is to be understood that the form of my invention, herewith shown and described, is to be taken as a preferred example of the same, and various changes in the size, shape and arrangement of parts may be resorted to without departing from the spirit of my invention, or scope of the appended claim.

Having thus described my invention, I claim:

A spraying machine comprising a tank supporting frame, a pump cylinder mounted on the frame beneath the tank and having a reciprocable piston, a rod connected to the piston, a spindle secured to the outer end of the rod in parallel relation to the rod, bearings carried by the frame slidably receiving the rod and spindle, means for reciprocating the piston connected to the rod and spindle, a spray nozzle connected to the cylinder, and means establishing communication between the cylinder and tank.

ROLAND JEFFORDS.